(12) United States Patent
Morris (10) Patent No.: US 6,606,693 B1
(45) Date of Patent: Aug. 12, 2003

(54) METHOD AND SYSTEM FOR LONG-TERM DIGITAL DATA STORAGE

(76) Inventor: Alan Morris, 5817 Plainview Rd., Bethesda, MD (US) 20817

(*) Notice: Subject to any disclaimer, the term of this patent is extended or adjusted under 35 U.S.C. 154(b) by 0 days.

(21) Appl. No.: 10/175,063

(22) Filed: Jun. 20, 2002

Related U.S. Application Data (60) Provisional application No. 60/356,739, filed on Feb. 15, 2002, provisional application No. 60/353,211, filed on Feb. 4, 2002, provisional application No. 60/331,306, filed on Nov. 14, 2001, and provisional application No. 60/324,287, filed on Sep. 25, 2001.

(51) Int. Cl.[7] .............................................. G06F 12/08
(52) U.S. Cl. ........................... 711/161; 711/162; 714/6
(58) Field of Search .............................. 711/161, 162; 707/204; 714/6, 7, 42

(56) References Cited

U.S. PATENT DOCUMENTS

| | | | |
|---|---|---|---|
| 3,872,448 A | 3/1975 | Mitchell, Jr. .................... | 705/3 |
| 5,515,502 A | 5/1996 | Wood .......................... | 714/15 |
| 5,615,364 A | 3/1997 | Marks ......................... | 707/202 |
| 5,764,972 A | 6/1998 | Crouse et al. ................. | 707/1 |
| 5,765,173 A | 6/1998 | Cane et al. ................... | 707/204 |
| 5,765,175 A | 6/1998 | Needham et al. ............. | 707/206 |
| 5,778,395 A | 7/1998 | Whiting et al. ............... | 707/204 |
| 5,884,328 A | 3/1999 | Mosher, Jr. .................. | 707/202 |
| 6,003,044 A | 12/1999 | Pongracz et al. ............ | 707/204 |
| 6,023,710 A | 2/2000 | Steiner et al. ............... | 707/204 |
| 6,026,414 A | 2/2000 | Anglin ....................... | 707/204 |
| 6,078,932 A | 6/2000 | Haye et al. .................. | 707/204 |
| 6,078,933 A | 6/2000 | Szalwinski .................. | 707/204 |
| 6,131,141 A | * 10/2000 | Ravid ......................... | 711/112 |
| 6,173,376 B1 | 1/2001 | Fowler et al. ............... | 711/162 |
| 6,199,074 B1 | 3/2001 | Kern et al. .................. | 707/204 |
| 6,202,135 B1 | 3/2001 | Kedem et al. ............... | 711/162 |
| 6,209,060 B1 | * 3/2001 | Machida ..................... | 711/114 |
| 6,226,759 B1 | 5/2001 | Miller et al. ................. | 714/6 |
| 6,260,069 B1 | 7/2001 | Anglin ........................ | 709/229 |
| 6,266,679 B1 | 7/2001 | Szalwinski et al. ......... | 707/204 |
| 6,317,814 B1 | 11/2001 | Blendermann et al. ..... | 711/162 |
| 6,324,548 B1 | 11/2001 | Sorenson .................... | 707/204 |

OTHER PUBLICATIONS

Charles M. Dollar, Authentic Electronic Records: Strategies for Long–Term Access, Jun., 1998, 8 pages, printed from http://www.rbarry.com/CSum1 . . . . .

(List continued on next page.)

*Primary Examiner*—Reginald G. Bragdon
*Assistant Examiner*—Midys Inoa
(74) *Attorney, Agent, or Firm*—Blank Rome LLP (57) ABSTRACT

An archival system of the present invention includes a controller and multiple storage mediums that are used for long-term storage of vast amounts of digital data. The archival system verifies that the original digital data remains intact and error-free, byte-by-byte, through time. The archival system makes it possible to migrate the digital data files onto new storage media, correct byte-by-byte to the original files, as new storage media and machines are developed and proven. The system also allows data to be accessed that is then-currently needed, while the storage of the data continues on in time, undisturbed and uncorrupted. The archival system enhances the security of the archived data through physical movement of duplicated archival data storage mediums to remote locations. This invention for long-term, error free storage of digital files solves (provides the solution for) the problems of backward-read compatibility and the uncertainty of storage media failure.

23 Claims, 7 Drawing Sheets

OTHER PUBLICATIONS

"Access to Information: Now and the Future," David Russon, ICSTI, World Conference on Science, Budapest, Jun. 27, 1999, www.icsti.org/russon–bud . . . , 2 pp.

"Building the Archives of the Future—Advances in Preserving Electronic Records at the National Archives and Records Administration," Kenneth Thibodeau, D–Lib Magazine, Feb. 2001, presented at Digital Library Forum 2000, Chicago, IL, Nov. 19, 2000, vol. 7, No. 2, 13 pp.

HD–Rosetta Archival Preservation Services, Norsam Technologies, www.norsam.com/hdrosetta.htm, 4 pp, ©2001.

John Garrett and Donald Sawyer, Archive Reference Model Gains Wide Acceptance, last revised Aug. 15, 2001; 3 pages, printed from http://nssdc.gsfc.nasa.gov/nssdc_news/sept00/archive_ref_model.html.

Cohasset Associates, Inc., Evidentiary Benefits and Business implications of Write–Once–Read Many ("WORM") Optical Disk Storage for Records Management, Hewlett–Packard Company Automated Storage, Aug. 2000, 28 pages, printed from http://www.aiim.org/documents/wp/HP-WORM.pdf.

Jack Scott and Dennis Martin article, Document Security and Privacy, Jul. 2002, e–doc Magazine–Enterprise Content Management at Work, 4 pages; printed from http://www.edocmagazine.com/ edoc_article_new.asp?ID=24431.

Robin Dale, Digital Preservation, Where we are. Where we're going. Where we need to be. CIMI Consortium Museum Intelligence, CIMI Awareness: Mar. 2002, 6 pages.

Jeff O'Brien, Electronic Records: Basic Concepts in preservation and Access; Saskatchewan Council for Archives and Archivists, Feb. ,1998, 8 pages; printed from http//scaa.usask.ca/e–paper.html.

Charles M. Dollar, Authentic Electronic Records: Strategies for Long–Term Access, Jun. 1998, 8 pages, printed from http://www.rbarry.com/CSum1 . . . . .

* cited by examiner

METHOD AND SYSTEM FOR LONG-TERM DIGITAL DATA STORAGE

RELATED APPLICATIONS

This application claims priority to provisional applications, Ser. Nos. 60/324,287, 60/331,306, 60/353,211 and 60/356,739, filed Sep. 25, 2001, Nov. 14, 2001, Feb. 4, 2002 and Feb. 15, 2002, respectively.

BACKGROUND OF THE INVENTION

1. Field of the Invention

There is a need to store large amounts of digital data for long periods of time in an error-free manner. These data are originally in digital format or are data that have been digitally scanned from original content. The data are to be stored as replacement for storage of the original content, or the data are to be stored in parallel to the storage of the original content. For instance, historians store historical documents and images in archives, and the military, police and security forces store vast amounts of information such as military maps, manuals, war records, fingerprint files, and iris recognition files. Still other types of information that are stored in mass are patent records, census records, geospatial records, images collections, and sound records of music and speeches.

2. Background of the Related Art

At various times in the period of the data storage, needs can arise for accessing the stored data. When data are needed for retrieval, the accessed data must be accurate. Thus, the data must be accessible, while at the same time the stored data must remain error-free and uncorrupted.

Conventional current-era digital data storage media useful for mass data storage have limited lifetimes before degradations and failures start to occur. Another drawback of digital data storage is that the equipment used to write to or read from stored data may no longer be available or operative 20 or 30 or 40 years from now, and new equipment may not be compatible with the old equipment. As the needs for digital data storage capacity increase, manufacturers will continue to bring out new storage equipment to meet these needs. However, making these new machines so as to be "backwards read-compatible," meaning that they can read old data stored many years ago, is technically difficult and expensive, and sometimes impossible.

SUMMARY OF THE INVENTION

Accordingly, it is an object of the present invention to provide a method and system for the long-term, error-free storage of digital data files. It is another object of the invention to provide a long-term storage system in which the storage media are not connected to outside users. It is another object of the invention to provide a long-term storage system in which the storage media are written-to one time only.

It is another object of the invention to provide a long-term storage system in which data are written from a source file, and then are verified and compared with the source file. It is another object of the invention to provide a long-term storage system in which the stored data are accessible without possibility of corrupting the stored data file. It is yet another object of the invention to provide a long-term storage system having error-free migration of stored data from current-era storage media to new-era storage media, thus to provide the solution to the "backwards read-compatible" problem.

In accordance with these and other objects, the archival system of the present invention includes a controller and multiple storage media that are used to archive digital data. The archival system verifies that the original data remains error-free and uncorrupted, byte-by-byte, through time. The archival system makes it possible to migrate the digital data files to new storage media, correct byte-by-byte to the original data files, as new storage media and machines are developed and proven.

The archival system also allows those data to be accessed that are then currently needed, while the archival storage of the data continues on through time, error-free and uncorrupted. The archival system enhances the security of the archived data through physical movement of duplicated archival data storage media to a remote location.

DETAILED DESCRIPTION OF THE PREFERRED EMBODIMENTS

In describing a preferred embodiment of the invention illustrated in the figures, specific terminology will be resorted to for the sake of clarity. However, the invention is not intended to be limited to the specific terms so selected, and it is to be understood that each specific term includes all technical equivalents that operate in similar manner to accomplish a similar purpose.

Figure 1:
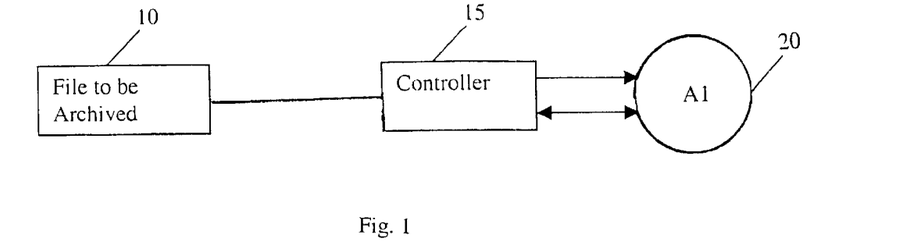
FIG. 1 is a block diagram of the archival system in which data to be archived are stored, using media A, to a first medium A1 in accordance with the preferred embodiment of the invention.

Turning to the figures, FIG. 1 shows an overview of the system as having a file or data to be archived 10, a controller 15 and a storage medium 20. In the figures, initial-era mediums are represented by a circular shape, the "A" media, and later new-era mediums 30 are represented by a rectangular shape, the "B" media. At the outset of the long-term storage process, the most current and proven digital storage media are preferably used and will serve though the initial-era storage period.

Types of current and proven digital storage media are magnetic disc, optical disc, and magnetic tape. An example of magnetic disc storage would be in the form of removable hard drives installed in racks. An example of optical disc storage would be in the form of DVD's installed in jukebox manipulators. An example of magnetic tape storage would be in the form of tape cartridges installed in tape library manipulators. It should be appreciated, however, that the type of storage media is not critical to the invention, and any suitable storage media can be used without departing from the spirit and scope of the invention.

The single-headed arrows used in the figures indicate a "write-to" action. In FIG. 1 the single-headed arrow indicates that the data file 10 is being written to the storage medium 20, via controller 15. The write-to action is preferably performed by the controller 15 which transfers the data file 10 to the storage medium 20. Though the file 10 and the storage medium 20 are shown as separate elements in the embodiment of FIG. 1, it should be apparent that the file 10 and the storage medium 20 need only be accessible by the controller 15. The file 10 and/or storage medium 20 can be stored at the controller 15, at a temporary storage location such as a tape or hard disc, or elsewhere. The size of the data file 10 being written to the storage medium 20 must not exceed the storage capacity of the medium 20.

The double-headed arrows used in the figures indicate a "verify-compare" action. In FIG. 1 the double-headed arrow indicates the use of a program in the controller 15 that verifies and compares that the data file 10 written to the storage medium 20 is identical to the data file 10. Double-headed arrows in the figures also indicate verify-compare actions, where the use of a program in the controller verifies and compares that the data file on one storage medium is identical to the data file on another storage medium.

Once the write-to and the verify-compare operations have been successfully completed, the storage mediums 20, 30 of the invention are never again written to so as to preclude any possible error-causing corruption of the stored data files. This "one-write," followed by "read-only," is an additional feature of the invention. All storage media used in the present invention have a "write-protect" feature. In some storage media, the "write-protect" feature has to be invoked after writing-to is completed. In other storage media, the "write-protect" feature operates automatically after writing-to is completed.

Figure 2:
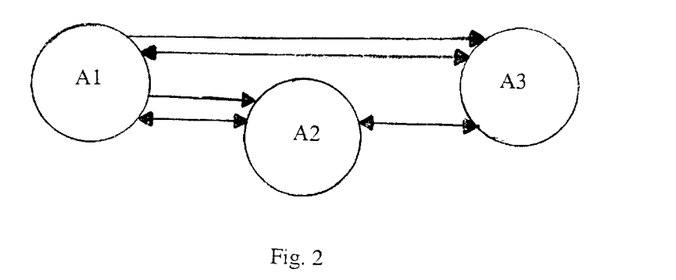
FIG. 2 is a block diagram showing a second medium A2 and third medium A3 being created from the first medium A1.

FIGS. 1–2 show the creation of the media array of this invention for long-term, error-free, accessible storage of digital data files. In FIG. 1, the controller 15 causes the file to be archived 10 to be written to medium A1 20. The controller 15 then conducts the verify compare to ensure that the data file written to Medium A1 is identical to the data file 10 to be archived. If the verify-compare is successful, then Medium A1 becomes the reference medium which is used to create the Medium A array. If the verify-compare fails, indicating that the file written to Medium A1 is not a correct, byte-by-byte recording of the file to be archived, then Medium A1 is destroyed.

Another Medium A is then designated as Medium A1, and the process of writing-to and verify-compare is repeated with the replacement Medium A1. If the verify-compare of the replacement Medium A1 is successful, then the replacement Medium A1 becomes the reference medium which is used to create the Medium A array. If the verify-compare fails, the replacement Medium A1 is destroyed, and the process of writing-to and verify-compare is repeated for further replacement Mediums A1 until the verify-compare is successful.

In FIG. 2, Medium A1 has been successfully written-to and verify-compared, and Medium A1 becomes the reference medium with which to create a three medium array, which array is referred to as the Medium A storage array. In FIG. 2, the controller 15 writes data from Medium A1 to Medium A3, and then verify-compares the data on Medium A3 to the data on Medium A1. The controller 15 also writes data from Medium A1 to Medium A2, and then verify-compares the data on Medium A2 to the data on Medium A1.

Finally, the controller 15 conducts the verify-compare of Medium A2 with Medium A3. If this final verify-compare action is successful, the Medium A storage array is created. It should be appreciated that while a specific medium, such as Medium A1, is shown in the Figures to be the reference medium for the writing-to and the verify-compare actions, any one of the media of the array can serve as the reference medium. In addition, it is redundant to verify-compare Medium A1 with A2, Medium A1 with A3, and Medium A2 with A3. For instance, the verify-compare of Medium A2 with A3 is not necessary since Medium A2 and A3 were already verified-compared with Medium A1. Accordingly, one of these verify-compares is optional to provide further confirmation of the accuracy of the data, and need not be conducted.

It should be noted that the various media 20 can be directly connected to each other, or indirectly connected through the controller 15. Thus, the media 20 can communicate directly with each other to perform the various operations at the direction of the controller 15, or they can communication with each other through the controller 15. Thus, the invention is not limited to the specific arrangement and connections shown in the embodiments.

Figure 3:
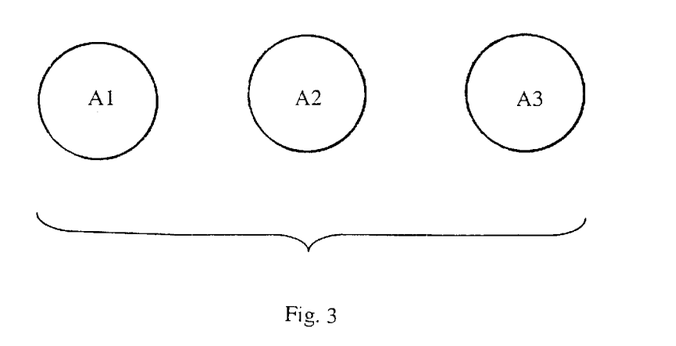
FIG. 3 shows an archival media A array comprised of the first, second and third mediums A1, A2 and A3.

FIG. 3 shows the complete three-medium Medium A storage array as having Medium A1, Medium A2, and Medium A3. The archival storage arrays have at least three mediums to provide triple redundancy. However, the invention is not limited to storage arrays comprised of three mediums, and any suitable number of mediums greater than three can be used. Additional mediums can be added out the outset to the storage array by extended applications of the write-to and verify-compare operations of FIG. 2. For example, the creation of a four medium array, with writing-to and verify-compare operations, as will be discussed below with respect to FIGS. 19–20. Additional mediums can be added at a later time to the storage array, with writing-to and verify-compare operations, as will be discussed below with respect to FIGS. 14–15.

It is recognized that, since the data files on each medium of a particular, individual array are identical to each other, the storage capacity of the array is limited in file size to what can be stored on one medium of the array. Thus, multiple arrays are needed if the data files to be archived are greater in size than the storage capacity of a single medium. For instance, multiple arrays are used to meet the need for archiving large data files of terabyte, petabyte, and exabyte sizes, with each array storing its fraction of the total file size being archived.

Figure 4:
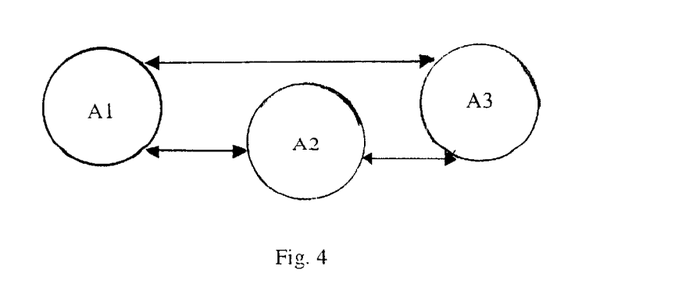
FIG. 4 shows a polling operation of the media A array of FIG. 3 that is a successful polling operation.
Figure 5:
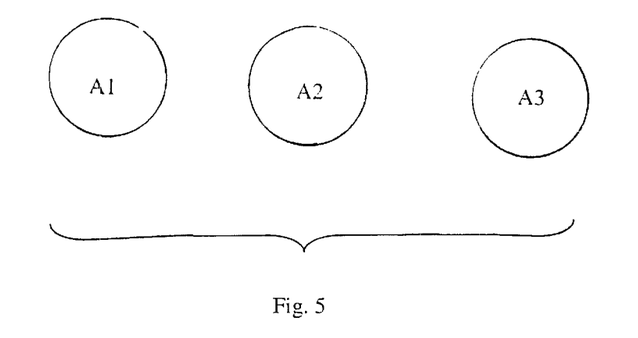
FIG. 5 shows the media A array of FIG. 4 continuing on through time as the archival storage medium array after the successful polling operation of FIG. 4.

At a point in time, under control of the controller, the Medium A array of FIG. 3 is subjected to a polling procedure to verify-compare the data stored on the media of the array. As shown in FIG. 4, Medium A1 is verify-compared with Medium A3, Medium A1 is verify-compared with Medium A2, and Medium A2 is verify-compared with Medium A3, though not necessarily in that order. FIG. 4 depicts a polling of the Medium A array where all the mediums of the array successfully pass the verify-compare, and the Medium A array having Medium A1, Medium A2, and Medium A3 continues on in time, as shown in FIG. 5, as the Medium A array, to the next polling.

The time interval between array pollings is initially best determined in consultation with the manufacturer of the specific initial-era storage media utilized for the archival storage. This will also be true in the future for new-era storage media when the decision is made to migrate the data files to new-era storage media. In the case of hard drives as the initial-era storage media, factors needing to be taken into account are, for example, power-on-hours, known storage life, mean time between failures, and specified conditions of temperature and humidity.

In the case of optical discs or tape cartridges as the initial-era storage media, factors needing to be taken into account are, for example, known storage life, and specified conditions of temperature and humidity. In addition, storage media life data can be compiled about the media utilized for the storage arrays by maintaining and analyzing the records of the time dates of media that failed verify-compare.

Figure 6:
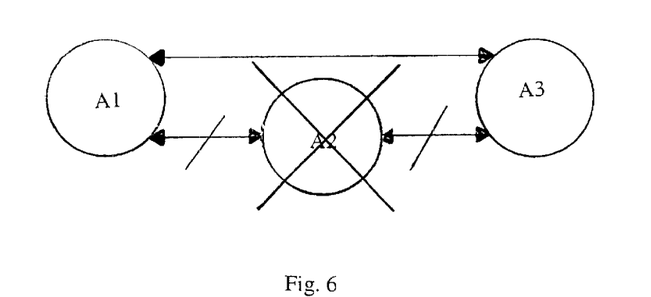
FIG. 6 shows the media A array of FIG. 4 continuing on through time as the archival storage medium array after the unsuccessful polling operation of FIG. 4 for medium A2.

FIG. 6 shows the next-scheduled polling for the Medium A array. Under control of the controller, Medium A1 is verify-compared with Medium A3, and the verify-compare is successful. However, the verify-compare between Medium A1 and Medium A2 fails, which indicates that Medium A2 is faulty. To confirm this, a verify-compare can also be conducted between Medium A2 and Medium A3. Since that comparison also fails, Medium A2 is confirmed as the faulty medium. Medium A2 is confirmed as the faulty medium, as indicated in FIG. 6 by the lines drawn through the double-headed verify-compare arrows, and also by the crossed lines drawn across Medium A2.

In the polling procedure of this invention, when the failure of the verify-compare occurs, the controller 15 activates an alarm for an attendant to remove and destroy the failed medium, an action which is referred to as the "odd man out" or as the "vote drop" principle.

Figure 7:
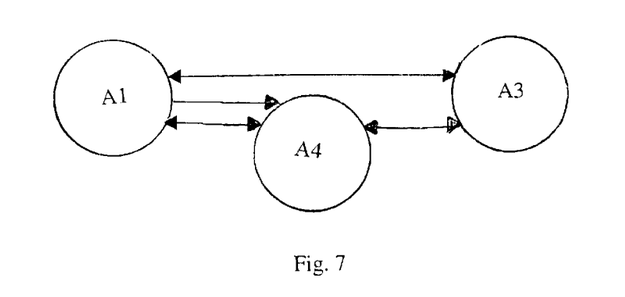
FIG. 7 shows a replacement medium A4 being created.
Figure 8:
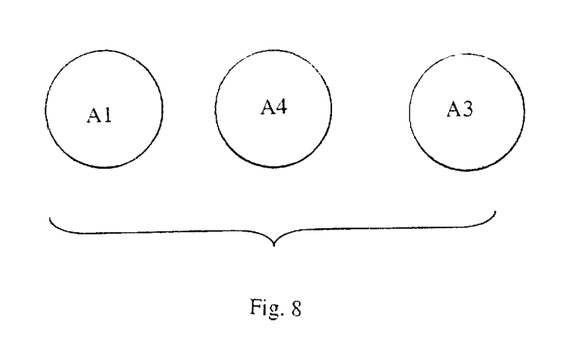
FIG. 8 shows the storage media A array now comprised of the two original mediums A1 and A3 and the replacement medium A4.

After removing and destroying the failed Medium A2, the attendant inserts a replacement Medium A4, as shown in FIG. 7. The controller 15 writes to the replacement Medium A4 from Medium A1, and conducts the verify-compare with Medium A1 and the replacement Medium A4. Then the controller 15 conducts a verify-compare between Medium A1 and Medium A3, and conducts a verify-compare between Medium A4 and Medium A3. Upon successful completion of the verify-compare operations, the Medium A array at this point in time, as shown in FIG. 8, is comprised of Medium A1, Medium A3, and Medium A4.

Figure 9:
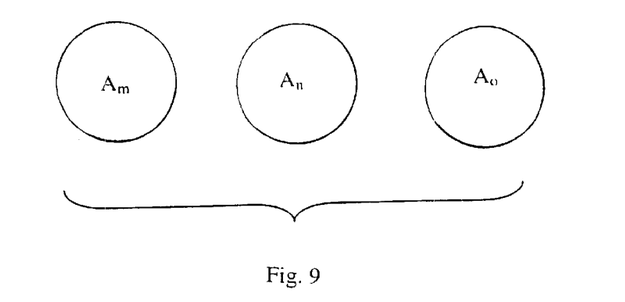
FIG. 9 shows a general case storage media A array, having mediums $A_m$, $A_n$, and $A_o$.

Following on through the years with polling, verify-compare, and possible failed-medium replacements, the Medium A array at some future point in time is the general case array having Medium $A_m$, Medium $A_n$, and Medium $A_o$, as shown in FIG. 9.

Error-Free Migration of Data Files to a New-Era Storage Media

Figure 10:
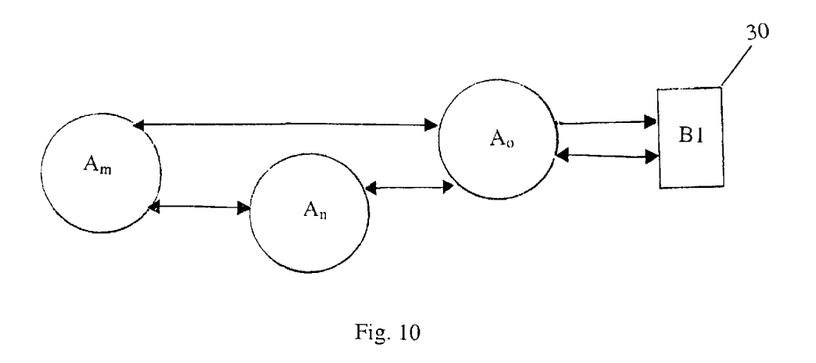
FIGS. 10–11 show a new-era storage media B array being created from the general case media A array of FIG. 9.

At some future point in time, when new storage media are developed, tested, and proven, there can be a decision made to migrate the data file stored on the Medium A array to an array comprised of a new-era media B 30. Just prior to migrating the data stored on media A to media B, a polling of the media A array takes place, as shown in FIG. 10. Once the polling of the media A array is successfully completed, then, as further shown in FIG. 10, one of the medium A writes-to, and is verify-compared with, the new Medium B1.

Figure 11:
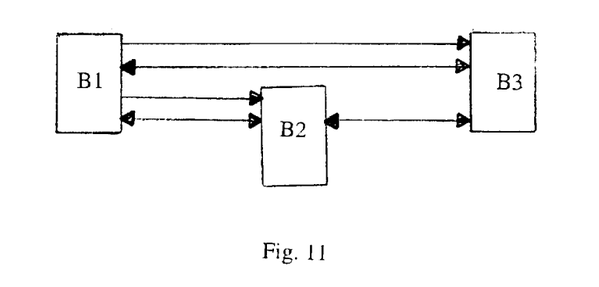

The creating of the initial Medium B array is shown in FIG. 11, which is analogous to the creation of the Medium A array shown in FIG. 2. In FIG. 11, Medium B1 is written to Medium B3, and then the data on Medium B3 is verified-compared with the data on Medium B1. Medium B1 is written to Medium B2, and Medium B2 is verify-compared with Medium B1, and Medium B2 is verify-compared with Medium B3.

Figure 12:
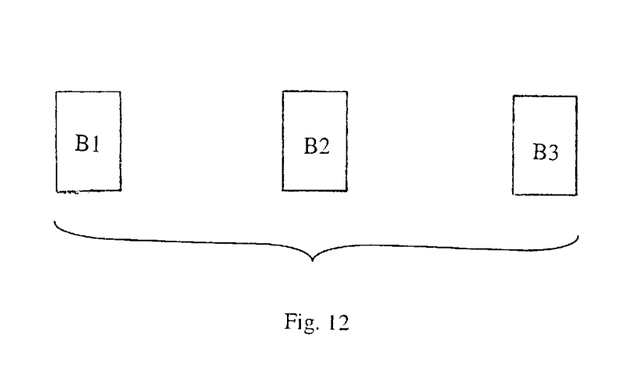
FIG. 12 shows the new-era storage media B array, having mediums B1, B2 and B3.

When the verify-compare actions of FIG. 11 are successfully concluded, the Medium B array is created. Thus, as shown in FIG. 12, the long-term, error-free, storage of the original data file is continued on with the Medium B array comprised of Medium B1, Medium B2 and Medium B3. The initial Medium A array can be destroyed.

Figure 13:
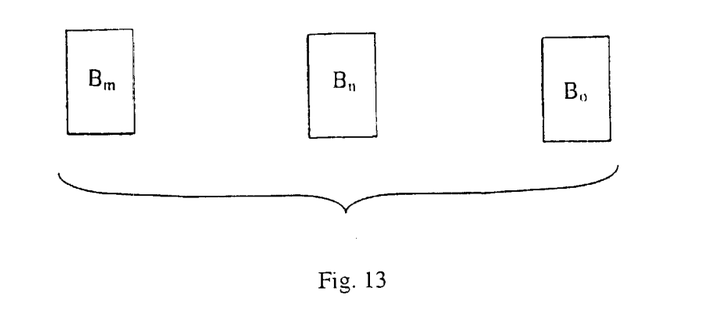
FIG. 13 shows a general case storage media B array, having mediums Bm, Bn, and Bo.

Following on through the years with polling, verify-compare, and possible failed-medium replacements, the Medium B array at some future point in time is the general case array having Medium $B_m$, Medium $B_n$, and Medium $B_o$, as shown in FIG. 13.

With the passage of time, it may prove necessary to migrate the data file to a new-era, proven, media C, and with the further passage of time, to media D, and so forth. The migration of the data file, for example, from a Medium B array to a Medium C array will be accomplished in a manner identical to that in which the data file from Medium A array was migrated to Medium B array, FIGS. 10–11. The long-term storage of the data file is continued on with the new Medium C array, and so forth.

Accessibility Feature

Outside connections to data storage exist in the case of ordinary data storage for purposes of data search, data retrieval, data input, data deletion, and data migration. Examples of connections include electrical, electronic and optical modes from outside of the controller 15. However, connections to the outside are not concomitant with long-term, error-free, archival data storage, since connections to outside sources to and from the stored data files can corrupt the archival data storage. To achieve long-term, error free archival storage of digital data files, connections to the outside cannot be allowed, and a physical barrier such as a locked and security-protected room must be erected around the archival storage array or arrays.

In order for long-term, error-free archived data to be available, if needed, during the time span of the archival period, the archived data must, at some point in time, be accessible outside of the physical barrier. Accessibility is a feature that is achieved in the invention by creating and adding an extra accessibility medium to a storage array. This accessibility extra medium, here termed Medium $A_{ACC1}$ in the case of a Medium A array, provides the capability for accessing the long-term stored data on the array to the outside, while the long-term, error-free storage of the data on the storage array continues on in time, undisturbed and uncorrupted. The extra Medium $A_{ACC1}$ can be added to the array at the outset as a fourth medium when the array is first created, or the extra medium can be added to the array at a later time.

Figure 14:
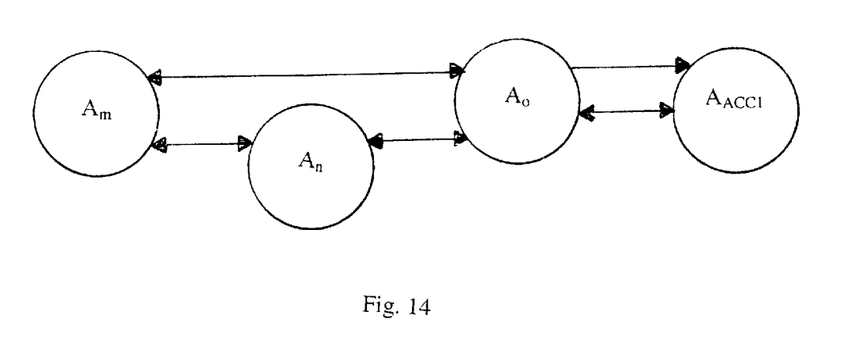
FIGS. 14–15 show the creation of an additional medium for a media A general case array, namely accessibility medium $A_{ACC1}$, with which an attendant can access data from the archival storage array, when those data in the archival storage array are needed, by physically removing medium $A_{ACCC1}$.

FIG. 14 shows the creation of the extra accessibility Medium $A_{ACC1}$. The array to which the extra medium will be added first undergoes the polling procedure with verify-compare of the media of the array. The polling procedure of Medium $A_m$, Medium $A_n$ and Medium $A_o$, if successful, will ensure the error-free integrity of the stored data when any medium of the array is used to write to the extra medium and to verify-compare the extra medium. The extra medium is inserted into the Medium A array, and one of the medium A, $A_o$ in FIG. 14, writes-to, and is verify-compared with, the extra medium. Following the successful verify-compare of Medium $A_o$ with the extra medium, the extra medium becomes the accessibility medium for the A array, Medium $A_{ACC1}$.

Figure 15:
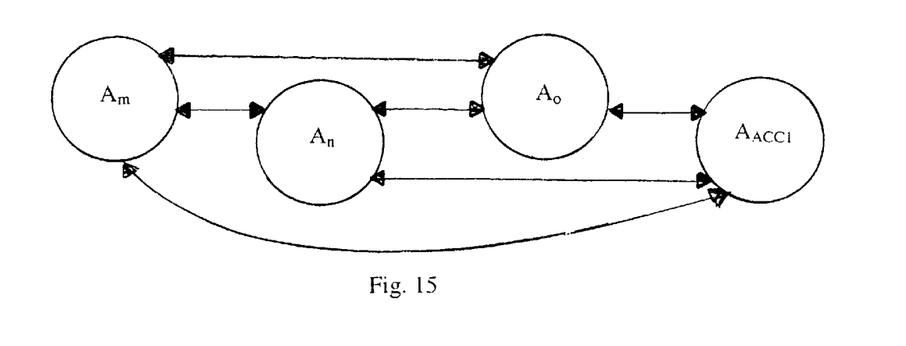

FIG. 15 shows the polling procedure for the four-medium Medium A array. This four-medium array polling procedure shown in FIG. 15 is similar to the three-media array polling procedure shown in FIG. 4.

When a need arises for accessing the data files that are long-term stored on the array, the extra accessibility Medium $A_{ACC1}$ is physically removed from the long-term storage array. The removed Medium $A_{ACC1}$ is taken to outside the physical barrier. Once Medium $A_{ACC1}$ is removed from the long-term storage array, Medium $A_{ACC1}$ must be taken outside the physical barrier, never to be returned to the long-term storage array. Once outside the physical barrier, the data on Medium $A_{ACC1}$ is utilized, after which Medium $A_{ACC1}$ is destroyed.

Figure 16:
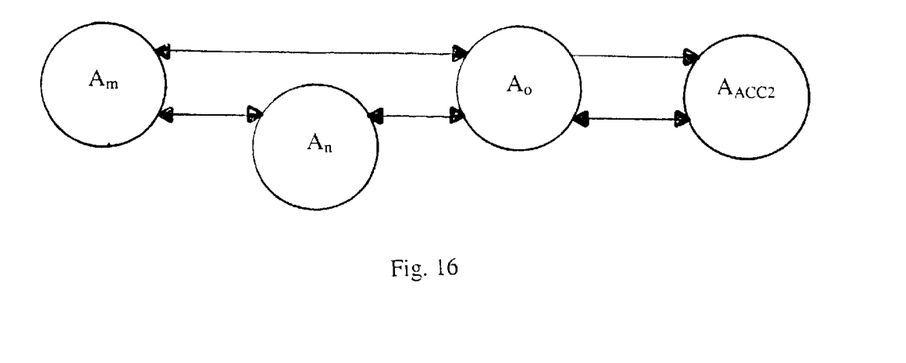
FIG. 16 shows the creation of a replacement accessibility medium $A_{Acc2}$ for the media A array, to replace the previous accessibility medium.

Upon the removal of the accessibility Medium $A_{ACC1}$ from the array, the array undergoes the polling procedure shown in FIG. 16, and a new, replacement extra medium is inserted into the array. FIG. 16 shows the new, replacement extra medium being written-to, and verify-compared. Following the successful verify-compare, the new, replacement extra medium becomes the new accessibility Medium $A_{ACC2}$.

Figure 17:
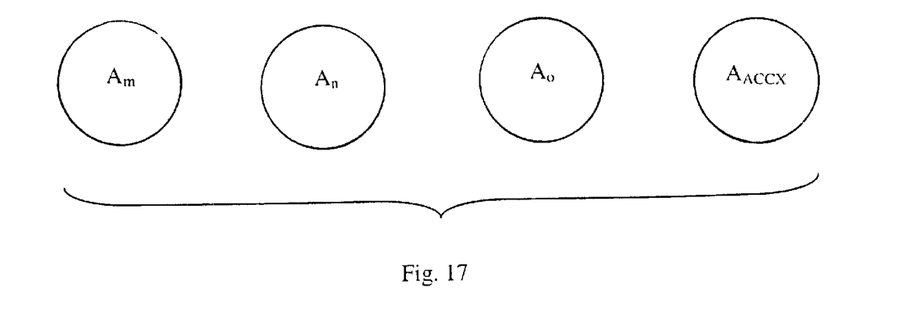
FIG. 17 shows a general case storage media A array with accessibility medium, having mediums $A_m$, $A_n$, $A_o$, and $A_{ACCX}$.

FIG. 17 shows the general case Medium A array with the accessibility feature, the array being comprised of Medium $A_m$, Medium $A_n$, Medium $A_o$, and Medium $A_{ACCX}$. Any number of extra mediums can be in use at any one time, and any number of extra mediums for the arrays can be created, verify-compared, removed, and replaced.

Security for the Archival Storage Arrays

In accordance with the preferred embodiment of the invention, physical interactions are required to insert and to remove media in the long-term storage array or arrays. The arrays are maintained in locked and supervised rooms, and the attendants are trained for their duties with the media of the arrays, and are processed for security clearances through measures such as background checks, fingerprinting, and iris recognition scans. For example, when removing an accessibility medium to serve as a source for outside data file needs, the attendant would be trained not to remove the accessibility medium while the controller 15 is polling the arrays. During the scheduled polling of the arrays, the controller 15 can display warning lights or engage mechanical interlocks that prevent the attendant from adding or removing media.

Enhanced Security for the Archived Data Files

An enhanced level of security is provided for the long-term data storage arrays to overcome the destructive effects of fire, earthquake, collapse, or terrorist attack, through the building of duplicate storage arrays wherein the duplicate arrays are transported to a secured remote site. At the remote site, the archival storage is continued on in time in parallel with the archival storage at the base site, with the protocols of polling procedures with verify-compare and with replacement of failed media in storage arrays at the remote site, and with migration of the archived storage to new-era storage medium.

Figure 18:
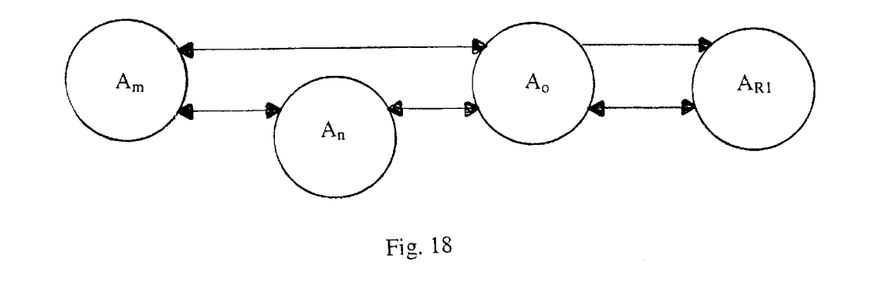
FIGS. 18–20 shows the creation of a duplicate media A storage array, destined for physical movement to a remote location, having mediums $A_{R1}$, $A_{R2}$, $A_{R3}$, and $A_{ACCR1}$.

FIG. 18 shows the creation of a remote location Medium $A_{R1}$. The base location array which will be used to create the remote location medium first undergoes polling. The base location array undergoes the polling procedure with verify-compare of the media of the array. The polling procedure of Medium $A_m$, Medium $A_n$, and Medium $A_o$, if successful, will ensure the error-free integrity of the stored data when any medium of the array is used to write-to the remote location medium and to verify-compare the remote location medium.

The remote location medium is inserted into the Medium A array, and a medium of the array, Medium $A_o$ in FIG. 18, writes-to the remote location medium. Following the successful verify-compare of Medium $A_o$ with the remote location medium, the remote location medium becomes the initial Medium $A_{R1}$ for the duplicate storage array. Medium $A_{R1}$ is removed from the A array, but Medium $A_{R1}$ remains within the physical barrier as the other mediums of the remote array are created.

Figure 19:
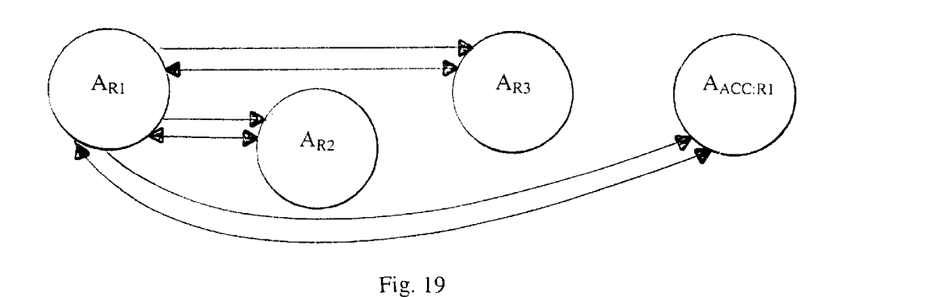

FIG. 19 shows the remote Medium $A_{R1}$ being utilized to write-to and to verify-compare the other media of the remote array. Alternatively, the other media of the remote array can be created in the same manner as Medium $A_{R1}$ was created, by being inserted into the A array, with writing-to and verify-compare, as shown in FIG. 18.

Figure 20:
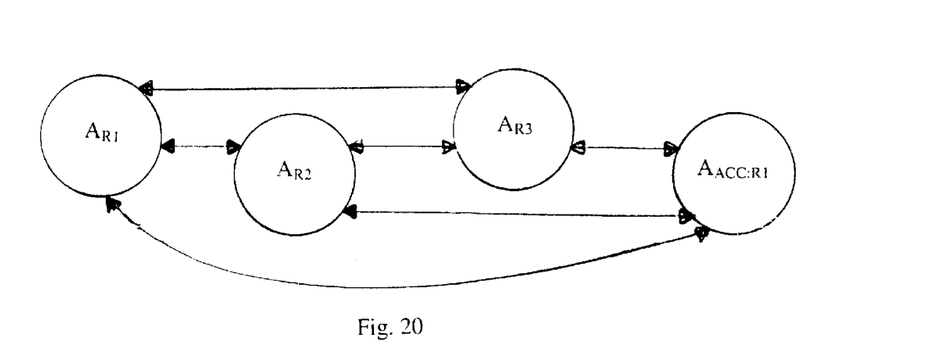
Figure 21:
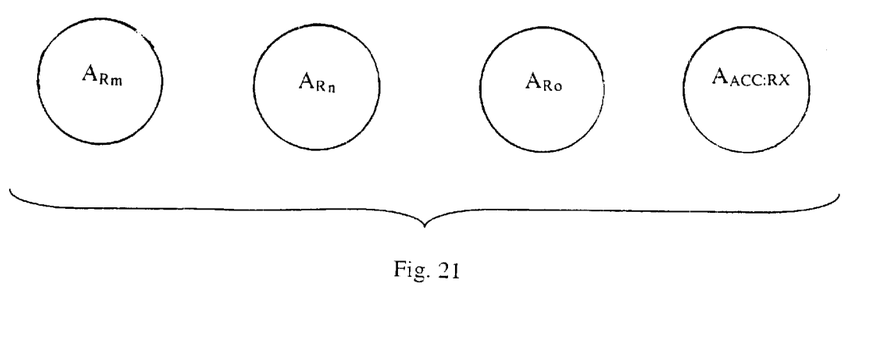
FIG. 21 shows a general case media A storage array at the remote location, having mediums $A_{Rm}$, $A_{Rn}$, $A_{Ro}$, and $A_{ACCRX}$.

The complete remote array is comprised of Medium $A_{R1}$, Medium $A_{R2}$, Medium $AR_3$, and Medium $A_{ACC:R1}$. FIG. 20 shows the polling and verify-compare procedures for the remote array before the array is transported to the remote location. The polling and verify-compare procedures shown in FIG. 20 are also used with the remote array at the remote location. FIG. 21 shows the general case remote location array, the array being comprised of Medium $A_{Rm}$, Medium $A_{Rn}$, Medium $A_{Ro}$, and Medium $A_{ACC:RX}$.

Verify-Compare Programs

Figure 22:
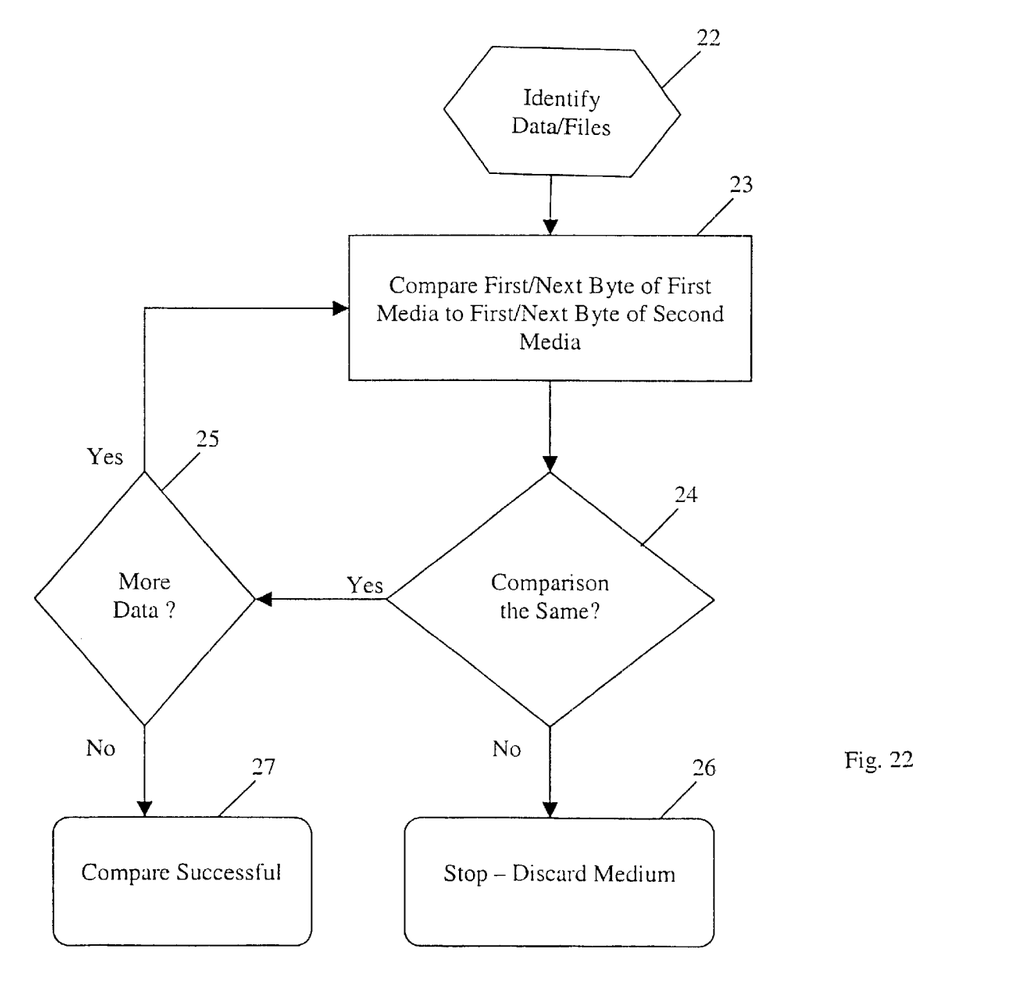
FIG. 22 is a flowchart showing the verify-compare operation in accordance with the invention.

FIG. 22 depicts the array controller 15 during the verify-compare operation. The operation begins at step 22, where the operator identifies the data files that are to be checked, and the media on which the data is located. Once the data is identified, the controller 15 checks the file allocation table on each of the media to determine the exact location of the file on the media. At step 23, the controller 15 compares the first byte from the first medium with the first byte from the second medium. This is preferably done by obtaining the first byte from the first medium and placing it into a CPU register (or temporary storage location). The controller 15 then gets the first byte from the second medium and places it into another CPU register.

At step 24, the controller 15 determines whether the comparison of the bytes stored in the two registers is the same. If the comparison is the same, the controller 15 proceeds to compare the next bytes of the data, step 23, until all the data are compared, step 25. If all the data comparison is the same, the controller 15 indicates that the comparison is successful, step 27, and the second medium is to be retained. However, if any of the comparisons are not successful, the controller 15 stops, step 26, and indicates to the operator that the second medium is to be destroyed.

Figure 23:
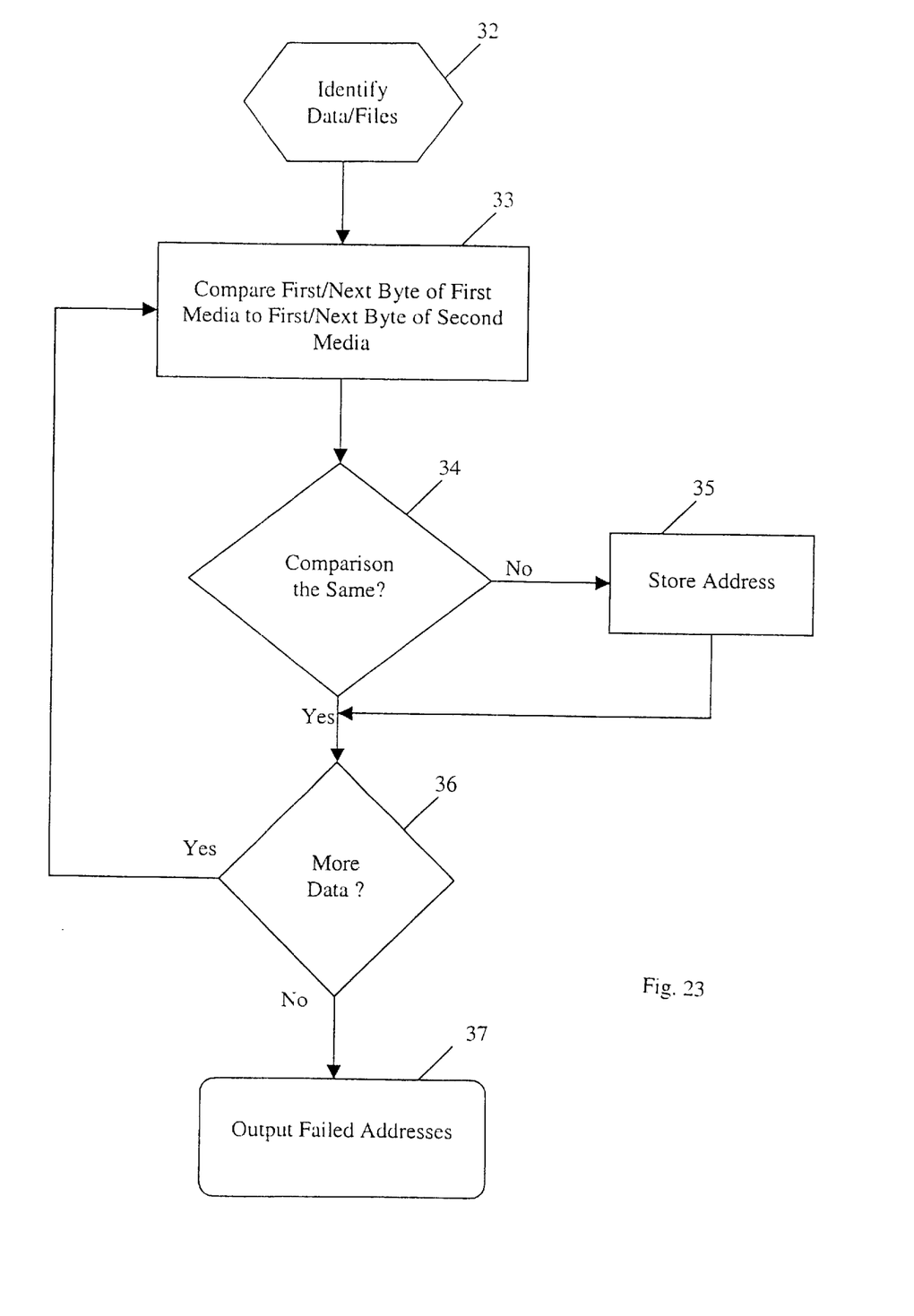
FIG. 23 is a flowchart showing the verify-compare operation to obtain information for studies of the failure rates of the storage media employed for the archival storage arrays.

FIG. 23 shows the array controller 15 during the verify-compare operation for the purpose of researching the in-service failure rates of any particular storage media, by analyses of the time spans of, and the details of, actual failures of the particular in-service media. Steps 32–34 are similar to steps 22–24 of FIG. 22, whereby the user identifies the data or files to be compared, step 32, the first bytes of the data are compared, step 33, and the results of the comparison are determined, step 34. If the comparison is the same, step 34, the controller 15 checks to see if there is more data, step 36 and, if so, proceeds to compare the next data, step 33.

If the comparison is not the same, step 34, the data address is stored, step 35, and the controller 15 picks up again at step 36 to check if there is more data to be compared. Once all the data has been compared, the controller 15 generates an output (i.e., displays, prints, etc.), step 37, that identifies which, if any, addresses were not successfully compared, as stored from step 35. If the comparisons were all the same at step 34, the output indicates that there are no failed comparisons.

Solutions

Storing data in digital form provides an efficient utilization of volumetric storage space and is efficient in terms of energy consumption (heating, air conditioning, dust filtering, humidity control, lighting). There are great savings in storage volume that are achieved though digitalization of text records and of images, and through subsequent long-term, error-free storage of the digital files accomplished through utilization of this invention.

This invention for long-term, error free storage of digital files solves (provides the solution for) the problems of backward-read compatibility and the uncertainty of storage media failure.

The present invention solves the problem of how to achieve long-term, error-free, storage of digital data files by: providing a system and method for verifying that the original data files remain intact, byte-by-byte, through time; providing an economical system and method that uses standard, available, proven storage media; providing a system and method that makes it possible to migrate the data files, error-free, to new storage media as new media are developed and are proven; providing a system and method in which the data files, while being stored long-term, are made accessible for outside use without corrupting the long-term storage; and by providing an enhanced level of security for the data files through the sending of duplicate archival storage arrays to remote locations.

The processor or controller 15 controls operation of the system, including the write-to and verify-compare between media. The controller 15 can be, for instance, a desktop computer, and the media can be removable hard drives in drawers that are integrated with the computer. In larger-scale applications, wherein the data files to be stored are in terabyte, petabyte, exabyte and zettabyte file sizes, the controller 15 can be dedicated controllers, or a network of controllers, and the initial-era storage media can be hundreds of hard drives housed in multiple-hard-drive equipment racks, or thousands of optical discs in jukebox manipulator equipment, or thousands of tape cartridges in tape library manipulator equipment.

In other embodiments, the mediums of each array, once written-to, and verify-compared, can be removed from the equipment and stored on appropriate material shelving within the security barrier, much as library books are stored on the shelving of book library stacks, awaiting temporary return to the equipment when polling is scheduled, or when an accessibility medium needs replacing. Each medium, whether maintained in the equipment, or stored on shelving, will have a permanently affixed identifying label. Each medium, whether maintained in the equipment, or stored on shelving, has an identifying controller-readable code in the medium, and has a permanently affixed identifying label.

Though the media are shown in the embodiments of FIGS. 1–21 as having data flowing directly between those media (i.e., the arrows directly point from one media to the other), the media need not be directly connected. Rather, the media can be connected to a respective controller 15, which controls the communication of data between the two or more media, all communication taking place within the physical barrier.

The foregoing description and drawings should be considered as illustrative only of the principles of the invention. The invention is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. A long-term storage system for storing data from a source medium, the system comprising:

a first long-term data storage medium array having a plurality of long-term data storage medium, each of said plurality of long-term data storage medium storing the same data; and, a controller for writing the data to each of said plurality of long-term data storage medium from a reference medium and verifying that the data written to each of said plurality of long-term data storage medium is the same as the data stored on the reference medium, and at a later time polling the data written to each of said plurality of long-term data storage medium to ensure that the data stored on each of said plurality of long-term data storage medium is the same.

2. The system of claim 1, wherein the reference medium comprises one of said plurality of long-term data storage medium.

3. The system of claim 1, wherein the reference medium comprises the source medium.

4. The system of claim 1, wherein each of said plurality of long-term data storage medium are write-protected to prevent further data being written to said plurality of long-term data storage medium after the data to be stored are written to the plurality of long-term data storage medium.

5. The system of claim 1, wherein said controller identifies that one of the plurality of long-term data storage medium is defective and should be removed and destroyed if the controller is unable to verify that the data stored on that one of the plurality of long-term data storage medium is the same as the data stored on the reference medium.

6. The system of claim 1, further comprising an accessibility medium, said controller writing the data from one of said plurality of long-term data storage mediums to said accessibility medium and verifying that the data written to said accessibility medium is the same as that one of said plurality of long-term data storage medium.

7. The system of claim 6, wherein a user can access the data from said accessibility medium without disturbing the data stored on the first long-term data storage medium array.

8. The system of claim 6, wherein said accessibility medium can be removed from the storage system for use outside the storage system, but the first long-term data storage medium array is not accessible outside the storage system.

9. The system of claim 1, wherein the controller verifies the data by comparing the data written to each of said plurality of long-term data storage medium with the reference medium on a byte-by-byte basis.

10. The system of claim 1, wherein said plurality of long-term data storage mediums comprise a first long-term data storage medium, second long-term data storage medium and third long-term data storage medium.

11. The system of claim 1, said controller polling the plurality of long-term data storage medium to verify that the data stored on each of said plurality of long-term data storage medium is the same and, if not the same, then indicating that one of the plurality of long-term data storage medium is defective.

12. The system of claim 11, wherein the defective long-term data storage medium is removed and destroyed.

13. The system of claim 1, said controller polling the plurality of long-term data storage medium to verify that the data stored on each of said plurality of long-term data storage medium is the same and, if not the same, then identifying the data addresses of each of said plurality of long-term data storage medium that is not the same.

14. The system of claim 1, further comprising a second long-term data storage medium array having a plurality of long-term data storage medium, the controller writing the data to each of said plurality of long-term data storage medium of said second medium array from one of the plurality of long-term data storage medium of said first long-term data storage medium array and verifying that the data written to each of said plurality of long-term data storage medium of said second long-term data storage medium array is the same as the data stored on the one of the plurality of long-term data storage medium of the first long-term data storage medium array.

15. A method for long-term storage of data stored on a source medium, the method comprising:

storing the data on the source medium to a first long-term data storage medium, and determining if the data stored on the first long-term data storage medium is the same as the data stored on the source medium and discarding the first long-term data storage medium if the data is not the same;

storing the data on the first long-term data storage medium to a second long-term data storage medium, and determining if the data stored on the second long-term data storage medium is the same as the data stored on the first long-term data storage medium and discarding the second long-term data storage medium if the data is not the same; and, polling, at a later time, the data written to each of said plurality of long-term data storage medium.

16. The method of claim 15, further comprising storing the data on the first long-term data storage medium to a third long-term data storage medium, and determining if the data stored on the third long-term data storage medium is the same as the data stored on the first long-term data storage medium and discarding the third long-term data storage medium if the data is not the same.

17. The method of claim 15, further comprising the step of write-protecting the plurality of long-term data storage medium to prevent further data from being written to the plurality of long-term data storage medium after the data to be stored are written to the plurality of long-term data storage medium.

18. The method of claim 15, further comprising storing the data on the first long-term data storage medium to an accessibility medium, and determining if the data stored on the accessibility medium is the same as the data stored on the first long-term data storage medium and discarding the accessibility medium if the data is not the same, wherein a user can access the data from the accessibility medium without disturbing the data stored on the first long-term data storage medium.

19. The method of claim 15, wherein the step of determining if the data stored on the first long-term data storage medium is the same as the data stored on the source medium comprises comparing the data stored on the first long-term data storage medium with the data stored on the source medium on a byte-by-byte basis, and the step of determining if the data stored on the second long-term data storage medium is the same as the data stored on the first long-term data storage medium comprises comparing the data stored on the second long-term data storage medium with the data stored on the first long-term data storage medium on a byte-by-byte basis.

20. The method of claim 15, further comprising the step of polling the first and second long-term data storage mediums to verify that the data stored on each of the long-term data storage medium are the same and, if not, indicating that one of the long-term data storage mediums is defective.

21. The method of claim 15, further comprising the steps of:

storing the data on the first long-term data storage medium to a third long-term data storage medium, and determining if the data stored on the third long-term data storage medium is the same as the data stored on the first long-term data storage medium and discarding the third long-term data storage medium if the data is not the same; and, storing the data on the third long-term data storage medium to a fourth long-term data storage medium, and determining if the data stored on the fourth long-term data storage medium is the same as the data stored on the third long-term data storage medium and discarding the fourth long-term data storage medium if the data is not the same.

22. The method of claim 21, wherein the first long-term data storage medium and the second long-term data storage medium form a first long-term data storage medium array and the third long-term data storage medium and fourth long-term data storage medium form a second long-term data storage medium array.

23. The method of claim 22, wherein the first long-term data storage medium array and second long-term data storage medium array are part of a storage system, the first long-term data storage medium array is not accessible outside the storage system, and the second long-term data storage medium array can be removed from the storage system for use outside the storage system.

* * * * *